US005657408A

United States Patent [19]
Ferm et al.

[11] Patent Number: 5,657,408
[45] Date of Patent: Aug. 12, 1997

[54] OPTICAL DEVICE COMPRISING A PLURALITY OF UNITS HAVING AT LEAST TWO GEOMETRICALLY-DIFFERENTIATED TAPERED OPTICAL WAVEGUIDES THEREIN

[75] Inventors: Paul Ferm, Morristown; Scott Zimmerman, Basking Ridge; Karl Beeson, Princeton, all of N.J.; John Schweyen, Tucson, Ariz.; Okan Tezucar, Coral Springs, Fla.

[73] Assignee: AlliedSignal Inc., Morris Township

[21] Appl. No.: 363,505

[22] Filed: Dec. 23, 1994

[51] Int. Cl.⁶ .................................................. G02B 6/26
[52] U.S. Cl. ............................ 385/43; 385/146; 385/901; 264/1.27; 349/57; 362/32
[58] Field of Search ............................ 385/43, 146, 132, 385/901; 264/1.27; 362/32; 349/57, 62

[56] References Cited

U.S. PATENT DOCUMENTS

| Re. 33,987 | 7/1992 | Kuzawa | 359/49 |
|---|---|---|---|
| 1,942,841 | 12/1934 | Shimizu | 359/455 |
| 3,180,214 | 4/1965 | Fox | 359/455 |
| 3,218,924 | 11/1965 | Miller | 359/456 |
| 3,279,314 | 10/1966 | Miller | 359/453 |
| 3,704,055 | 11/1972 | Hong | 359/455 |
| 4,240,692 | 12/1980 | Winston | 350/96.1 |
| 4,298,246 | 11/1981 | Iwamura | 359/455 X |
| 4,379,617 | 4/1983 | Funakoshi et al. | 359/453 |
| 4,404,471 | 9/1983 | Douglas et al. | 250/482.1 |
| 4,573,764 | 3/1986 | Bradley | 359/455 |
| 4,605,283 | 8/1986 | Stanton | 359/455 X |
| 4,606,609 | 8/1986 | Hong | 359/455 |
| 4,660,930 | 4/1987 | van der Hoorn et al. | 359/453 |

(List continued on next page.)

FOREIGN PATENT DOCUMENTS

| 0 525 755 A1 | 7/1992 | European Pat. Off. . |
|---|---|---|
| 0573268 | 12/1993 | European Pat. Off. . |
| 57-207235 | 12/1982 | Japan . |
| 58-114026 | 7/1983 | Japan . |
| 60-75826 | 4/1985 | Japan . |
| 61-165838 | 7/1988 | Japan . |
| 1017471 | 6/1963 | United Kingdom . |

OTHER PUBLICATIONS

Patent Abstract of Japan, vol. 008, No. 271 (P-320) 12 Dec. 1984.
JP, A, 59 140434 (Mitsubishi Rayon KK), 11 Aug. 1984.
WO, A, 94 27171 (Enplas Corp; Watai Kayoko (JP) Ishiakwa Tsuyoshi (JP) 24 Nov. 1994.
GB, A, 26, 965 (A.S. Levy) 12 Jun. 1912.
Ultra-Wide Viewing Angle Rear Projection Television Screen, Ralpn Bradley, Jr. Jill Goldeberg, and T. McKechnie, Manuscript received Jun. 10, 1985, pp. 185–193.

*Primary Examiner*—Phan T. H. Palmer
*Attorney, Agent, or Firm*—Colleen Szuch; Melanie Brown

[57] ABSTRACT

The present invention provides an optical device comprising: (a) a substrate; and (b) a plurality of units on the substrate. Each of the units comprises a plurality of tapered waveguides wherein: (i) each of the waveguides has a light input surface adjacent the substrate (a) and a light output surface distal from the light input surface and the light input surface area is greater than the light output surface area; (ii) each of the waveguides tapers from its light input surface to its light output surface at an angle; and (iii) at least one of the light input surface area or the light output surface area of at least one of the tapered waveguides is different than the corresponding surface area of the remaining tapered waveguides in the unit. Preferably, the optical device is a viewing film. The present viewing film has reduced or substantially eliminated intensity hot spots and interference patterns. The present viewing film may be used in display devices, such as for example projection display devices, off screen display devices, and direct view displays. Such displays are used in a wide range of applications including computer terminals, airplane cockpit displays, automotive instrument panels, televisions, and other devices which provide text, graphics, or video information.

20 Claims, 10 Drawing Sheets

U.S. PATENT DOCUMENTS

| | | | |
|---|---|---|---|
| 4,666,248 | 5/1987 | van de Ven | 359/455 |
| 4,679,900 | 7/1987 | McKechnie et al. | 359/453 |
| 4,682,853 | 7/1987 | Broer et al. | 359/455 |
| 4,688,093 | 8/1987 | van der Staak et al. | 359/455 |
| 4,692,359 | 9/1987 | Fitzpatrick . | |
| 4,695,135 | 9/1987 | Den Exter Blockland et al. | 350/452 |
| 4,701,019 | 10/1987 | Fitzpatrick | 350/127 |
| 4,701,020 | 10/1987 | Bradley et al. | 359/455 |
| 4,721,361 | 1/1988 | van de Ven | 359/455 |
| 4,725,448 | 2/1988 | Fitzpatrick | 427/45.1 |
| 4,730,897 | 3/1988 | McKechnie et al. | 350/128 |
| 4,751,509 | 6/1988 | Kubota et al. | 340/784 |
| 4,762,393 | 8/1988 | Gerritsen et al. | 359/455 |
| 4,767,186 | 8/1988 | Bradley, Jr. et al. | 359/455 |
| 4,776,670 | 10/1988 | Kessels et al. | 350/252 |
| 4,955,937 | 9/1990 | Dona et al. | 82/1.11 |
| 4,964,695 | 10/1990 | Bradley, Jr. | 350/129 |
| 5,005,945 | 4/1991 | van de Ven | 359/455 |
| 5,076,661 | 12/1991 | Bradley | 359/456 |
| 5,101,279 | 3/1992 | Kurematsu et al. | 358/241 |
| 5,132,830 | 7/1992 | Fukutani et al. | 359/67 |
| 5,151,801 | 9/1992 | Hiroshima | 359/40 |
| 5,159,478 | 10/1992 | Akiyama et al. | 359/69 |
| 5,462,700 | 10/1995 | Beeson et al. | 385/146 X |
| 5,481,385 | 1/1996 | Zimmerman et al. | 359/40 |

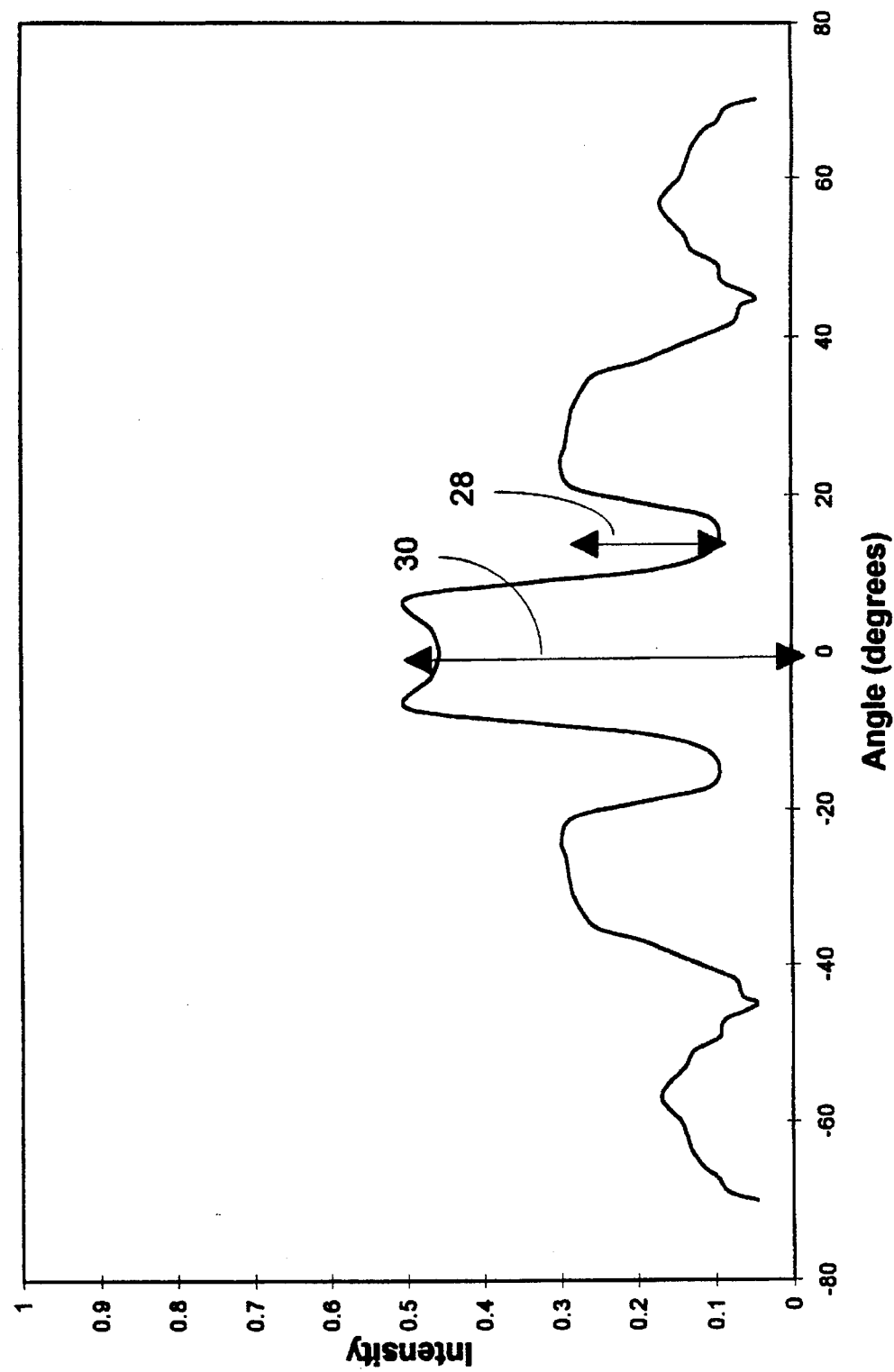

Scale = 200 microns

OPTICAL DEVICE COMPRISING A PLURALITY OF UNITS HAVING AT LEAST TWO GEOMETRICALLY-DIFFERENTIATED TAPERED OPTICAL WAVEGUIDES THEREIN

BACKGROUND OF THE INVENTION

The present invention relates to an optical device comprising a plurality of units having at least two geometrically-differentiated tapered optical waveguides therein.

Optical waveguides, also known in the art as light transmissive devices or lightguides, find application in display devices, such as for example projection display devices, off screen display devices, and direct view displays. Typically, an optical element having a plurality of optical waveguides is used. See for example U.S. Pat. Nos. 3,218,924 and 3,279,314 to Miller and U.S. Pat. No. 4,767,186 to Bradley, Jr. et al. Such displays are used in a wide range of applications including computer terminals, airplane cockpit displays, automotive instrument panels, televisions, and other devices that provide text, graphics, or video information.

Such known displays suffer from the following problems. Depending on the exact optical waveguide geometry, known displays may produce non-monotonically decreasing light output intensity as the viewing angle is changed from normal to the optical device to parallel to the optical device. See FIG. 10 which shows the minima which occur in such a light distribution output pattern. A viewer will perceive the peaks between such lows in the light distribution output pattern as intensity hot spots, which will be clearly disadvantageous to the perception of a uniformly emissive optical device.

Another problem which occurs in known displays is the occurrence of Moire and other interference patterns. A typical liquid crystal display device has a first polarizer element, a first substrate with pixel electrodes on it and a matrix circuit section to apply voltage to these pixel electrodes, a liquid crystal layer, a second substrate having a black matrix layer with openings, and a second polarizer element. A pixel is formed by the openings on the second substrate and the pixel electrodes on the first substrate. When an optical device is assembled with such a liquid crystal display device, Moire and other inference patterns often occur because the critical dimensions for pixel pitch separation line width are similar or nearly similar to the critical dimensions for the optical device. Viewing these patterns is unappealing.

Another problem which occurs in known displays is that very specific output distributions of the light may be hard to achieve with just one type of optical waveguide present within said optical device. The output distribution of the light will be solely defined by that waveguide and thus the waveguide must be specifically designed to exactly accomodate the needs of the user.

Thus, a need exists in the art for an optical device wherein the occurrence of intensity hot spots and Moire and other interference patterns is reduced or substantially eliminated so as to provide a more uniformly emissive optical device.

SUMMARY OF THE INVENTION

We have developed an optical device which responds to the foregoing need in the art. The optical device comprises: (a) a substrate; and (b) a plurality of units on the substrate. Each of the units comprises a plurality of tapered waveguides wherein: (i) each of the waveguides has a light input surface adjacent the substrate (a) and a light output surface distal from the light input surface and the light input surface area is greater than the light output surface area; (ii) each of the waveguides tapers from its light input surface to its light output surface; and (iii) at least one of the light input surface area or the light output surface area of at least one of the tapered waveguides is different than the corresponding surface area of the remaining tapered waveguides in the unit.

When used as a viewing film, the present optical device is particularly advantageous. Because at least one of the light input and output surface areas of at least one of the tapered waveguides is different than the corresponding surface area of the remaining tapered waveguides in the unit, the occurrence of intensity hot spots and Moire and interference patterns is reduced or substantially eliminated. As a result, the viewing film provides a more uniformly emissive display.

In addition, the combination of tapered waveguides within a unit can be choosen such that a very specific output distribution can be achieved through the combined effects of the waveguides and is not required to result from a single waveguide type.

Other advantages of the present invention will be apparent from the following description, attached drawings, and attached claims.

BRIEF DESCRIPTION OF THE DRAWINGS

FIG. 10 illustrates the resulting light distribution of the tapered optical waveguide element having a square output surface area which is 10 microns on a side used in Example 1.

DETAILED DESCRIPTION OF THE PREFERRED EMBODIMENTS

Figure 1:
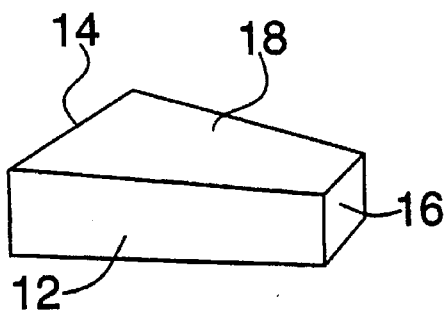
FIG. 1 illustrates a tapered optical waveguide element with a rectangular or square base useful in the present invention.
Figure 2:
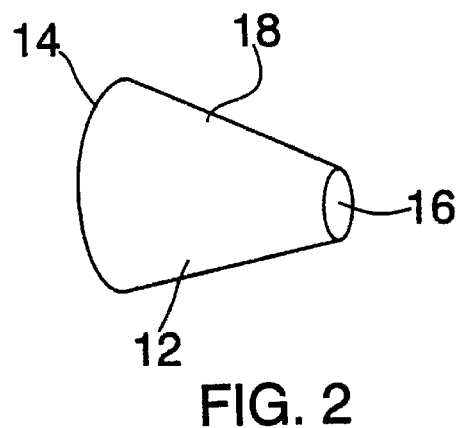
FIG. 2 illustrates a tapered optical waveguide element with a circular base useful in the present invention.

As shown in FIGS. 1 and 2, each tapered waveguide 12 has a light input surface 14, light output surface 16, and sidewalls 18. The area of light input surface 14 is greater than the area of light output surface 16 for each tapered waveguide 12. The cross section of a tapered waveguide 12 in a plane parallel to the substrate surface may have any shape including a circle, square, hexagon, ellipse, and rectangle. FIG. 1 shows a tapered waveguide 12 with a rectangular cross section viewed in perspective. FIG. 2 shows a tapered waveguide 12 with a circular cross section viewed in perspective. The shape of sidewalls 18 may be straight or curved. When waveguide 12 has a taper such that the area of light output surface 16 is smaller than the area of light input surface 14, the angular distribution of the light emerging from light output surface 16 will be larger than the angular distribution of the light entering the light input surface 14. The present viewing film having a plurality of tapered waveguides 12 when used with a display will alter the angular distribution of the output light from a modulating means such that the image from the modulating means may be viewed at higher angles. The area of light output surface 16 of each tapered waveguide 12 is preferably from about 1 to about 50 percent of the area of light input surface 14, more preferably from about 3 to about 25 percent of the area of light input surface 14, and most preferably from about 4 to about 12 percent of the area of light input surface 14.

In order that a display having the present viewing film therein has high overall light throughput, the sum of the areas for all waveguide light input surfaces is preferably greater than about 40 percent of the total areas of the substrate of the viewing film, more preferably greater than about 60 percent of the total areas of the substrate of the viewing film, and most preferably greater than about 80 percent of the total areas of the substrate of the viewing film.

Figure 3:
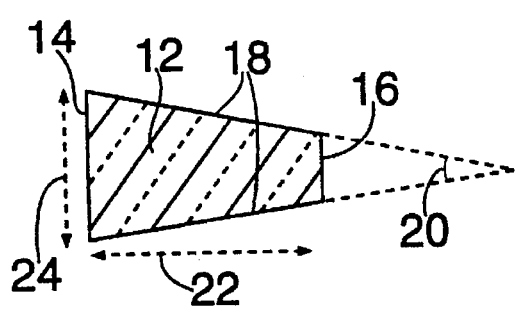
FIG. 3 illustrates the taper angle, light input surface dimension, and light output surface dimension of the tapered optical waveguide element.

A single tapered waveguide 12 with light input surface 14, light output surface 16, and straight sidewalls 18 is shown in FIG. 3. If tapered straight sidewalls 18 are extended until they intersect, they form taper angle 20. The value of taper angle 20 ranges preferably from about 2 degrees to about 14 degrees, more preferably from about 4 degrees to about 12 degrees, and most preferably from about 6 degrees to about 10 degrees.

Tapered waveguide 12 has a height 22. Dimension 24 is the minimum transverse distance across the waveguide light input surface 14. For example, if light input surface 14 has the shape of a square, dimension 24 is the length of one side of the square. As another example, if light input surface 14 has the shape of a rectangle, dimension 24 is the smaller of the two side dimensions of the rectangle. The specific values for dimension 24 may vary widely depending on the center-to-center distance between adjacent pixels of a modulating means. In order that the resolution of the image formed by a modulating means not be degraded, dimension 24 should be equal to or less than the center-to-center distance between adjacent pixels of a modulating means. For example, if the center-to-center distance between adjacent pixels in a modulating means is 200 microns, then dimension 24 is preferably in the range from about 5 microns to about 200 microns, more preferably in the range from about 15 microns to about 200 microns, and most preferably from about 25 microns to about 100 microns.

After dimension 24 is selected, height 22 may be specified by the ratio of height 22 to dimension 24. The ratio of height 22 to dimension 24 may vary widely depending on how much one wishes to increase the angular distribution of light emerging from the light output surface 16 compared to the angular distribution of light entering light input surface 14. The ratio of height 22 to dimension 24 is preferably from about 0.25 to about 20, more preferably from about 1 to about 8, and most preferably from about 2 to about 6.

In each unit, at least one of the light input surface area 14 or the light output surface area 16 of at least one of the tapered waveguides 12 is different than the corresponding light input surface area or light output surface area of the remaining tapered waveguides in the unit. The term "different" as used herein means that at least one of the light input surface area or light output surface area of at least one of the tapered waveguides is different than the corresponding light input surface area or light output surface area of the remaining tapered waveguides in the unit by at least about 2 percent. For example, if the light input surface area of one of the tapered waveguides is x, each light input surface area of the remaining tapered waveguides in the unit is at least 1.02x or no more than 0.98x. As another example, if the light output surface area of one of the tapered waveguides is y, each light output surface area of the remaining tapered waveguides in the unit is at least 1.02y or no more than 0.98y. At least one of the light input surface area or light output surface area of at least one of the tapered waveguides is different than the corresponding light input surface area or light output surface area of the remaining tapered waveguides in the unit by preferably at least about 5 percent, more preferably at least about 10 percent, and most preferably at least about 20 percent.

Thus, the different surface areas include the following: (1) at least one light input surface area of at least one tapered waveguide is different than each light input surface area of the remaining tapered waveguides in the unit, (2) at least one light output surface area of at least one tapered waveguide is different than each light output surface area of the remaining tapered waveguides in the unit, and (3) both the light input and output surface areas of at least one tapered waveguide are different than both the light input and output surface areas of the remaining tapered waveguides in the unit.

Figure 4:
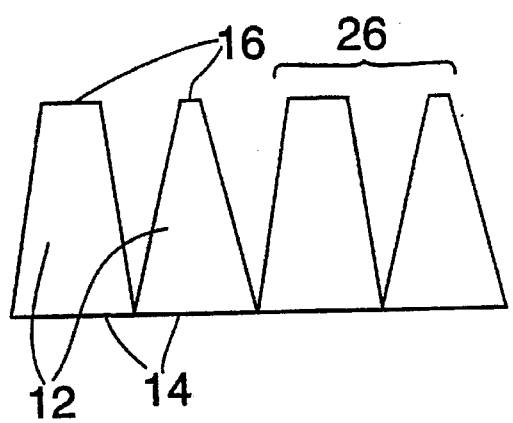
FIG. 4 illustrates the side view of a unit of two tapered optical waveguide elements which have different light output surface areas and identical light input surface areas.
Figure 5:
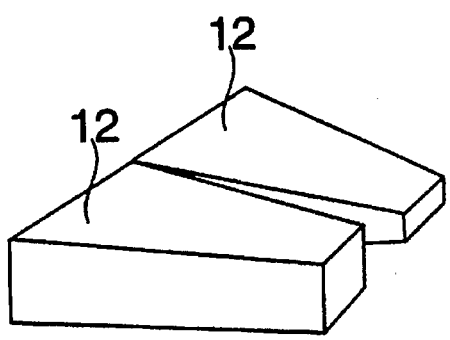
FIG. 5 illustrates a perspective view of the unit of the two different tapered optical waveguide elements of FIG. 4.
Figure 6:
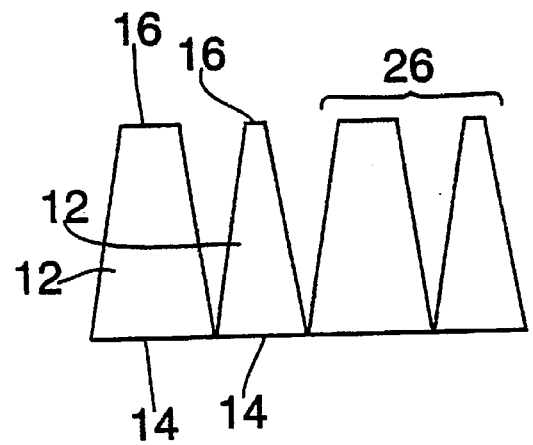
FIG. 6 illustrates the side view of a unit of two tapered optical waveguide elements which have different light input and output surface areas.

FIG. 4 illustrates the side view of a unit 26 of a plurality of two tapered waveguides 12 which have different light output surface areas 16, the same light input surface areas 14., and the same heights 22. FIG. 5 illustrates a perspective view of the unit 26 of FIG. 4. FIG. 6 illustrates the side view of a unit 26 of a plurality of two tapered waveguides 12 which have different light input surface areas 14, different light output surface areas 16, and the same heights 22.

Preferably, at least two of the tapered waveguides 12 in a unit have at least one of their light input surface areas 14 or their light output surfaces area 16 which are different than the corresponding light input surface areas or light output surface areas of the remaining tapered waveguides in the same unit and more preferably, they also have light input surface areas 14 or light output surface areas 16 which differ from each other. Most preferably, each tapered waveguide 12 in a unit has at least one of its light input surface area 14 or its light output surface area 16 which is different than the corresponding light input surface area or light output surface area of every other tapered waveguide in the same unit.

The tapered waveguides 12 may have any shape including but not limited to rectangle, square, circle, ellipse, and hexagon. Within a unit 26, the tapered waveguides 12 may have the same shape or although not illustrated, the tapered waveguides 12 may have different shapes. For example, within a unit 26, one tapered waveguide 12 may have a rectangular cross section while a second tapered waveguide 12 may have a circular cross section. Most preferably, the shapes of the tapered waveguides 12 are selected so as to maximize the fill factor which is the sum of all the light input areas divided by the unit area. The different shapes of the cross section of the tapered waveguides within a unit include the following:

|  | Rectangle | Square | Circle | Ellipse | Hexagon |
| --- | --- | --- | --- | --- | --- |
| 1 | All waveguides | — | — | — | — |
| 2 | — | All waveguides | — | — | — |
| 3 | — | — | All waveguides | — | — |
| 4 | — | — | — | All waveguides | — |
| 5 | — | — | — | — | All waveguides |
| 6 | At least one waveguide | Remaing waveguides | — | — | — |
| 7 | At least one waveguide | — | Remaining waveguides | — | — |
| 8 | At least one waveguide | — | — | Remaining waveguides | — |
| 9 | At least one waveguide | — | — | — | Remaining waveguides |
| 10 | Remaining waveguides | At least one waveguide | — | — | — |
| 11 | — | At least one waveguide | Remaining waveguides | — | — |
| 12 | — | At least one waveguide | — | Remaining waveguides | — |
| 13 | — | At least one waveguide | — | — | Remaining waveguides |
| 14 | Remaining waveguides | — | At least one waveguide | — | — |
| 15 | — | Remaining waveguides | At least one waveguide | — | — |
| 16 | — | — | At least one waveguide | Remaining waveguides | — |
| 17 | — | — | At least one waveguide | — | Remaining waveguides |
| 18 | Remaining waveguides | — | — | At least one waveguide | — |
| 19 | — | Remaining waveguides | — | At least one waveguide | — |
| 20 | — | — | Remaining waveguides | At least one waveguide | — |
| 21 | — | — | — | At least one waveguide | — |

-continued

|  | Rectangle | Square | Circle | Ellipse | Hexagon |
| --- | --- | --- | --- | --- | --- |
| 22 | Remaining waveguides | — | — | — | At least one waveguide |
| 23 | — | Remaining waveguides | — | — | At least one waveguide |
| 24 | — | — | Remaining waveguides | — | At least one waveguide |
| 25 | — | — | — | Remaining waveguides | At least one waveguide |
| 26 | At least one waveguide | At least one waveguide | Remaining waveguides | — | — |
| 27 | At least one waveguide | At least one waveguide | — | Remaining waveguides | — |
| 28 | At least one waveguide | At least one waveguide | — | — | Remaining waveguides |
| 29 | At least one waveguide | Remaining waveguides | At least one waveguide | — | — |
| 30 | At least one waveguide | — | At least one waveguide | Remaining waveguide | — |
| 31 | At least one waveguide | — | At least one waveguide | — | Remaining waveguide |
| 32 | At least one waveguide | Remaining waveguides | — | At least one waveguide | — |
| 33 | At least one waveguide | — | Remaining waveguides | At least one waveguide | — |
| 34 | At least one waveguide | — | — | At least one waveguide | Remaining waveguides |
| 35 | At least one waveguide | Remaining waveguides | — | — | At least one waveguide |
| 36 | At least one waveguide | — | Remaining waveguides | — | At least one waveguide |
| 37 | At least one waveguide | — | — | Remaining waveguides | At least one waveguide |
| 38 | Remaining waveguides | At least one waveguide | At least one waveguide | — | — |
| 39 | — | At least one waveguide | At least one waveguide | Remaining waveguides | — |
| 40 | — | At least one waveguide | At least one waveguide | — | Remaining waveguides |
| 41 | Remaining waveguides | At least one waveguide | — | At least one waveguide | — |
| 42 | — | At least one waveguide | Remaining waveguides | At least one waveguide | — |
| 43 | — | At least one waveguide | — | At least one waveguide | Remaining waveguides |
| 44 | Remaining waveguides | At least one waveguide | — | — | At least one waveguide |
| 45 | — | At least one waveguide | Remaining waveguides | — | At least one waveguide |
| 46 | — | At least one waveguide | — | Remaining waveguides | At least one waveguide |
| 47 | Remaining waveguides | — | At least one waveguide | At least one waveguide | — |
| 48 | — | Remaining waveguides | At least one waveguide | At least one waveguide | — |
| 49 | — | — | At least one waveguide | At least one waveguide | Remaining waveguides |
| 50 | Remaining waveguides | — | At least one waveguide | — | At least one waveguide |
| 51 | — | Remaining waveguides | At least one waveguide | — | At least one waveguide |

-continued

| | Rectangle | Square | Circle | Ellipse | Hexagon |
|---|---|---|---|---|---|
| 52 | — | — | At least one waveguide | Remaining waveguides | At least one waveguide |
| 53 | Remaining waveguides | — | — | At least one waveguide | At least one waveguide |
| 54 | — | Remaining waveguides | — | At least one waveguide | At least one waveguide |
| 55 | — | — | Remaining waveguides | At least one waveguide | At least one waveguide |
| 56 | At least one waveguide | At least one waveguide | At least one waveguide | Remaining waveguides | — |
| 57 | At least one waveguide | At least one waveguide | At least one waveguide | — | Remaining waveguides |
| 58 | At least one waveguide | At least one waveguide | Remaining waveguides | At least one waveguide | — |
| 59 | At least one waveguide | At least one waveguide | — | At least one waveguide | Remaining waveguides |
| 60 | At least one waveguide | At least one waveguide | Remaining waveguides | — | At least one waveguide |
| 61 | At least one waveguide | At least one waveguide | — | Remaining waveguides | At least one waveguide |
| 62 | At least one waveguide | Remaining waveguides | At least one waveguide | At least one waveguide | — |
| 63 | At least one waveguide | — | At least one waveguide | At least one waveguide | Remaining waveguides |
| 64 | At least one waveguide | Remaining waveguides | At least one waveguide | — | At least one waveguide |
| 65 | At least one waveguide | — | At least one waveguide | Remaining waveguides | At least one waveguide |
| 66 | At least one waveguide | Remaining waveguides | — | At least one waveguide | At least one waveguide |
| 67 | At least one waveguide | — | Remaining waveguides | At least one waveguide | At least one waveguide |
| 68 | Remaining waveguides | At least one waveguide | At least one waveguide | At least one waveguide | — |
| 69 | — | At least one waveguide | At least one waveguide | At least one waveguide | Remaining waveguides |
| 70 | Remaining waveguides | At least one haveguide | At least one waveguide | — | At least one waveguide |
| 71 | — | At least one waveguide | At least one waveguide | Remaining waveguides | At least one waveguide |
| 72 | Remaining waveguides | — | At least one waveguide | At least one waveguide | At least one waveguide |
| 73 | — | Remaining waveguides | At least one waveguide | At least one waveguide | At least one waveguide |
| 74 | At least one waveguide | At least one waveguide | At least one waveguide | At least one waveguide | Remaining waveguide |
| 75 | At least one waveguide | At least one waveguide | At least one waveguide | Remaining waveguides | At least one waveguide |
| 76 | At least one waveguide | At least one waveguide | Remaining waveguides | At least one waveguide | At least one waveguide |
| 77 | At least one waveguide | Remaining wavaguides | At least one waveguide | At least one waveguide | At least one waveguide |
| 78 | Remaining waveguides | At least one waveguide | At least one waveguide | At least one waveguide | At least one waveguide |

Preferably, within a unit 26, each tapered waveguide has a shape which is different than the shape of every other tapered waveguide in the same unit.

Although U.S. Pat. No. 4,605,283 teaches that elongated mutually parallel identical ribs may have any desired shape and may or may not be all identically shaped, this teaching would not have led one skilled in the art to the present invention.

The tapered waveguides 12 are made of transparent solid polymer materials which have an index of refraction between about 1.45 and about 1.65 and include commercially available polymethylmethacrylate, poly(4-methylpentene), polycarbonate, polyester, polystyrene, and polymers formed by photopolymerization of acrylate or methacrylate monomers. Preferably, the tapered waveguides are made of a photopolymerizable material which comprises two essential ingredients. The first essential ingredient is a photopolymerizable monomer, especially an esthetically unsaturated monomer which will provide a transparent solid polymer material. More preferred materials have an index of refraction between about 1.50 and about 1.60 and include polymers formed by photopolymerization of acrylate or methacrylate monomer mixtures composed of urethane acrylates or urethane methacrylates, ester acrylates or ester methacrylates, epoxy acrylates or epoxy methacrylates, poly(ethylene glycol) acrylates or poly(ethylene glycol) methacrylates or vinyl containing organic monomers. It is useful to utilize a mixture of toohomers in the photopolymerizable mixture in order to fine tune the properties of the composition such as to fine tune crosslinking density, viscosity, adhesion, curing rate, and refractive index and to reduce discoloration, cracking, and delamination properties of the photopolymer formed from the composition.

Examples of useful more preferred monomers include methyl methacrylate; n-butyl acrylate (BA); 2-ethylhexyl acrylate (EHA); isodecyl acrylate; 2-hydroxyethyl acrylate; 2-hydroxypropyl acrylate; cyclohexyl acrylate (CHA); 1,4-butanediol diacrylate; ethoxylated bisphenol A diacrylate; neopentylglycol diacrylate (NPGDA); diethyleneglycol diacrylate (DEGDA); diethylene glycol dimethacrylate (PEGDMA); 1,6-hexanediol diacrylate (HDDA); trimethylol propane triacrylate (TMPTA); pentaerythritol triacrylate (PETA); pentaerythritol tetra-acrylate (PETTA); phenoxyethyl acrylate (PEA); β-carboxylethyl acrylate (β-CEA); isobornyl acrylate (IBOA); tetrahydrofurfuryl acrylate (THFFA); propylene glycol monoacrylate (MPPGA); 2-(2-ethoxyethoxy) ethyl acrylate (EOEOEA); N-vinyl pyrrolidone (NVP); 1,6-hexanediol dimethacrylate (HDDMA); triethylene glycol diacrylate (TEGDA) or dimethacrylate (TEGDMA); tetraethylene glycol diacrylate (TTEGDA) or dimethacrylate (TTEGDMA); polyethylene glycol diacrylate (PEGDA) or dimethacrylate (PEGDMA); dipropylene glycol diacrylate (DPGDA); tripropylene glycol diacrylate (TPGDA); ethoxylated neopentyl glycol diacrylate (NPEOGDA); propoxylated neopentyl glycol diacrylate (NPPOGDA); aliphatic diacrylate (ADA); alkoxylated aliphatic diacrylate (AADA); aliphatic carbonate diacrylate (ACDA); trimethylolpropane trimethacrylate (TMPTMA); ethoxylated trimethylolpropane triacrylate (TMPEOTA); propoxylated trimethylolpropane triacrylate (TMPPOTA); glyceryl proxylated triacrylate (GPTA); tris (2-hydroxyethyl) isocyanurate triacrylate (THEICTA); dipentaerythritol pentaacrylate (DPEPA); ditrimethylolpropane tetraacrylate (DTMPTTA); and alkoxylated tetraacrylate (ATTA).

Especially useful are mixtures wherein at least one monomer is a multifunctional monomer such as a diacrylate or triacrylate, as these will produce a network of crosslinks within the reacted photopolymer. The most preferred materials for use in the present invention are crosslinked polymers formed by photopolymerizing mixtures of ethoxylated bisphenol A diacrylate and trimethylol propane triacrylate. The index of refraction of the most preferred materials ranges from about 1.53 to about 1.56. It is not essential that the refractive index of the transparent solid material be homogeneous throughout the waveguide element. It may be advantageous to cause to be present, inhomogeneities in refractive index, such as striations or scattering particles or domains, as these inhomogeneities may further increase the divergence of light from the output of the waveguides.

The amount of monomer in the photopolymerizable material may vary widely. The amount of monomer or the total amount of a mixture of monomers is usually from about 60 to about 99.8 percent by weight of the photopolymerizable material, preferably from about 80 to about 99 percent by weight of the photopolymerizable material, and more preferably from about 85 to about 99 percent by weight of the photopolymerizable material.

As another essential component, the polymerizable material includes a photoinitiator which is activated by actinic radiation to produce activated species which lead to photopolymerization of the monomer. The photoinitiator system will contain a photoinitiator and preferably a conventional sensitizer which extends the spectral response into regions having spectral utility, e.g. the near ultraviolet region and the visible spectral regions where lasers excite and where many common optical materials are transmissive. Usually, the photoinitiator is a free radical-generating addition polymerization initiator activated by actinic light and is preferably thermally inactive at and below room temperature (e.g. about 20° C. to about 25° C.)

Illustrative of such initiators are those described in U.S. Pat. No. 4,943,112 and references cited therein. Preferred free radical initiators are 1-hydroxy-cyclohexyl-phenyl ketone (Irgacure 184); benzoin; benzoin ethyl ether; benzoin isopropyl ether; benzophenone; benzidimethyl ketal (Irgacure 651); α,α-diethyloxy acetophenone, α,α-dimethyloxy-α-hydroxy acetophenone (Darocur 1173); 1-[4-(2-hydroxyethoxy)phenyl]-2-hydroxy-2-methyl-propan-1-one (Darocur 2959); 2-methyl-1-[4-methylthio)phenyl]-2-morpholino-propan-1-one (Irgacure 907); 2-benzyl-2-dimethylamino-1-(4-morpholinophenyl)-butan-1-one (Irgacure 369); poly{1-[4-(1-methylvinyl)phenyl]-2-hydroxy-2-methyl-propan-1-one} (Esacure KIP); [4-(4-methylphenylthio)-phenyl]phenylmethanone (Quantacure BMS); di-campherquinone; and 50% 1-hydroxycyclohexyl phenyl ketone and 50% benzophenone (Irgacure 500).

The more preferred photoinitiators includes benzidimethyl ketal (Irgacure 651); α,α-diethyloxy acetophenone; α,α-dimethyloxy-α-hydroxy acetophenone (Darocur 1173); 1-hydroxy-cyclohexyl-phenyl ketone (Irgacure 184); 1-[4-(2-hydroxyethoxy)phenyl]-2-hydroxy-2-methyl-propan-1-one (Darocur 2959); 2-methyl-1-4-(methylthio)phenyl]-2-morpholino-propan-1-one (Irgacure 907); 2-benzyl-2-dimethylamino-1-(4-morpholinophenyl)butan-1-one (Irgacure 369); and 50% 1-hydroxycyclohexyl phenyl ketone and 50% benzophenone (Irgacure 500). The most preferred photoinitiators are those which, tend not to yellow upon irradiation and, thus, do not increase the coloration of the composition on the Gardner scale to a value of greater than 8 points on exposure to a temperature of 190° C. for 24 hours as determined by ASTM D1544-80. Such photoinitiators include benzidimethyl ketal (Irgacure 651); α,α-dimethyloxy-a-hydroxy acetophenone (Darocur 1173); 1-hydroxy-cyclohexyl-phenyl ketone (Irgacure-184); 1-[4-(2-hydroxyethoxy)phenyl]-2-hydroxy-2-methyl-propan-1-one (Darocur 2959); and 50% 1-hydroxycyclohexyl phenyl ketone and 50% benzophenone (Irgacure 500).

The amount of photoinitiator which must be present to form a gradient of substantially collimated ultraviolet light across the thickness of the photopolymerizable mixture is from about 0.1 to about 12 percent by weight based on the total weight of the photopolymerizable material. The amount of photoinitiator is preferably from about 0.5 to about 12 percent by weight, and more preferably from about 0.5 to about 8 percent by weight based on the total weight of the photopolymerizable material. It is realized that the desired gradient will be influenced not only by the concentration of the initiator but by the choice of irradiating wavelengths present in the exposure source, which may be controlled by those skilled in the art.

In addition to the essential ingredients, the photopolymerizable material may include various optional ingredients such as stabilizers, inhibitors, plasticizers, optical brighteners, release agents, chain transfer agents, other photopolymerizable monomers, and the like.

The photopolymerizable material preferably includes a stabilizer to prevent or reduce degradation which leads to property deterioration such as cracking and delamination after heat aging at 190° C. in air for 24 hrs. as defined by ASTM D 4538-90A and yellowing (coloration of greater than 8 on the Gardner Color Scale as determined by ASTM D 1544-80) after such heat aging. Such stabilizers include UV absorbers, light stabilizers, and antioxidants.

UV absorbers include hydroxyphenyl benzotriazoles, such as 2-[2-hydroxy-3,5-di(1,1-dimethylbenzyl)phenyl]-2-H-benzotriazole (Tinuvin 900); Poly(oxy-1,2-ethanediyl), α-(3-(3-(2H-benzyotriazol-2-yl)-5-(1,1-dimethylethyl)-4-hydroxyphenyl)-1-oxopropyl)-ω-hydroxy (Tinuvin 1130); and 2-[2-hydroxy-3,5-di(1,1-dimethylpropyl)phenyl]-2-H-benzotriazole (Tinuvin 238) and hydroxybenzophenones such as 4-methoxy-2-hydroxybenzophenone and 4-n-octoxy-2-hydroxybenzophenone. Light stabilizers include hindered amines such as 4-hydroxy-2,2,6,6-tetramethylpiperidine, 4-hydroxy-1,2,2,6,6-pentamethylpiperidine, 4-benzoyloxy-2,2,6,6-tetramethylpiperidine, bis(2,2,6,6-tetramethyl-4-piperidinyl)sebacate (Tinuvin 770); bis(1,2,2,6,6-pentamethyl-4-piperidinyl)sebacate (Tinuvin 292); bis(1,2,2,6,6-pentamethyl-4-piperidinyl)-2-n-butyl-2-(3,5-di-tert-butyl-4-hydroxybenzyl)malonate (Tinuvin 144); and polyester of succinic acid with N-β-hydroxy-ethyl-2,2,6,6-tetramethyl-4-hydroxy-piperidine (Tinuvin 622). Antioxidants include substituted phenols such as 1,3,5-trimethyl-2,4,6-tris(3,5-di-tert-butyl)-4-hydroxybenzyl)benzene, 1,1,3-tris-(2-methyl-4-hydroxy-5-tertbutyl)phenyl)butane, 4,4'-butylidene-bis-(6-tert-butyl-3-methyl)phenol, 4,4'-thiobis-(6-tert-butyl-3-methyl)phenol, tris-(3,5-di-tert-butyl-4-hydroxybenzyl)isocyanurate, cetyl-3,5-di-tert-butyl-4-hydroxybenzene (Cyasorb UV2908); 3,5-di-tert-butyl-4-hydroxybenzoio aoid, 1,3,5-tris-(tert-butyl-3-hydroxy-2,6-dimethylbenzyl) (Cyasorb 1790); stearyl-3-(3,5-di-tert-butyl-4-hydroxyphenyl)proprionate (Irganox 1076); pentaerythritol tetrabis(3,5-di-tert-butyl-4-hydroxyphenyl) (Irganox 1010); and thiodiethylene-bis-(3,5-di-tert-butyl-4-hydroxy)hydrocinnamate (Irganox 1035).

The preferred stabilizers used in this invention are antioxidants. Preferred antioxidants are selected from substituted phenols such as 1,3,5-trimethyl-2,4,6-tris(3,5-di-tert-butyl)-4-hydroxybenzyl)benzene, 1,1,3-tris-(2-methyl-4-hydroxy-5-tert-butylphenyl)butane, 4,4'-butylidene-bis-(6- tert-butyl-3-methylphenol, 4,4'-thiobis-(6-tert-butyl-3-methylphenol, tris-(3,5-di-tert-butyl-4-hydroxybenzyl) isocyanurate, cetyl-3,5-di-tert-butyl-4-hydroxybenzene (Cyasorb UV 2908); 3,5-di-tert-butyl-4-hydroxybenzoic acid, 1,3,5-tris-tert-butyl-3-hydroxy-2,6-dimethylbenzyl) (Cyasorb 1790); stearyl-3-(3,5-di-tert-butyl-4-hydroxyphenyl)proprionate (Irganox 1076); pentaerythritol tetrabis(3,5-di-tert-butyl-4-hydroxyphenyl) (Irganox 1010); and thiodiethylene-bis-(3,5-di-tert-butyl-4-hydroxy) hydrocinnamate (Irganox 1035). The most preferred stabilizers include pentaerythritol tetrabis(3,5-di-tert-butyl-4-hydroxyphenyl) (Irganox 1010); thiodiethylene-bis-(3,5-di-tert-butyl-4-hydroxy)hydrocinnamate (Irganox 1035); and stearyl-3-(3,5-di-tert-butyl-4-hydroxyphenyl)proprionate (Irganox 1076).

The amount of stabilizers in the composition may vary widely and is usually from about 0.1 to about 10 percent by weight of the photopolymerizable material. The amount of stabilizer is preferably from about 0.1 to about 5 percent by weight of the photopolymerizable material and more preferably from about 0.2 to about 3 percent by weight of the photopolymerizable material.

To make the present viewing film, the tapered waveguides 12 may be manufactured on a substrate. The tapered waveguides 12 may be manufactured by a variety of techniques including injection molding, compression molding, hot roller pressing casting, and photopolymerization processes. A preferred technique is a photopolymerization process wherein the tapered waveguides 12 are formed by ultraviolet light irradiation of a layer of the photopolymerizable material through a patterned mask as described in co-pending Ser. No. 08/148,794 filed Nov. 8, 1993 now U.S. Pat. No. 5,462,700 which is incorporated herein by reference. A substrate is placed on top of a layer of photopolymerizable material which, in turn, is placed over a bottom support plate having a release layer.

The mask bears a pattern of opaque areas which allow ultraviolet light to pass through only in the areas which comprise the desired pattern of the tapered waveguides. Ultraviolet light, as from a mercury or xenon lamp, is directed to fall on the surface of the mask. Ultraviolet light which passes through the clear areas of the mask causes a photopolymerization reaction in the exposed regions of the photopolymerizable layer which are directly under the clear image areas of the mask. No photoreaction occurs in those areas of photopolymerizable layer which are shielded from the ultraviolet light by the opaque areas of mask. After irradiation by ultraviolet light, both mask and bottom support plate with release layer are removed. The unreacted monomers are washed away with a suitable solvent such as acetone, methanol, or isopropanol leaving a pattern of photopolymerized regions on the substrate. Photopolymerized regions correspond to the array of tapered waveguides of the present invention.

In order that the tapered waveguides 12 have the proper tapered shape, the optical absorption of the unreacted photopolymerizable layer at the wavelengths of the ultraviolet light must be high enough such that a gradient of ultraviolet light intensity is established through the film during ultraviolet light exposure. That is, the amount of ultraviolet light available in the monomer layer to cause the initiation of the photoreaction will decrease from the top, or the image mask side, towards the bottom, or the bottom support plate side, due to the finite absorption of the monomer layer. This gradient of ultraviolet light causes a gradient in the amount of photopolymerization reaction that occurs from top to bottom, and this results in the unique tapered geometry of the developed waveguide structures, a geometry which is easily accessible with the method of the present invention.

The gradient in the amount of photopolymerization which occurs from the top to the bottom of the film may be further influenced by the presence of dissolved oxygen gas in the photopolymerizable layer, such oxygen acting to curtail or quench the photopolymerization reaction except in those areas where all oxygen has been consumed by the free radicals produced in the photopolymerization process. Such action of dissolved oxygen gas on the progress of photopolymerization reactions is well known to those skilled in the art. Further, the requisite geometry of the photopolymer structures may be further influenced by the process of self-focussing. That is, the light falling on the surface of the monomer layer initiates photopolymerization at that surface, and since the refractive index of the solidified polymer material is higher than that of the liquid monomer, it acts to refract the light passing through it. In this manner, the aerial image of light falling on the monomer nearer to the bottom of the monomer layer is altered through refraction caused by the already-polymerized material which lies above it. This effect may cause a narrowing of the resultant polymerized structure from the top surface, upon which the imaging light was directed, towards the bottom, or support plate side of the layer.

The index of refraction of interstitial regions between the tapered waveguides must be less than the index of refraction of the tapered waveguides. Preferred materials for interstitial regions include air, with an index of refraction of 1.00, fluoropolymer materials with an index of refraction ranging from about 1.30 to about 1.40, and silicone materials with an index of refraction ranging from about 1.40 to about 1.44. The most preferred materials are air and fluorinated polyurethane.

In a preferred embodiment of the present invention, the interstitial regions between the tapered waveguides also comprise a light absorptive material, as for example light absorptive black particulate material. By utilizing a light absorptive material in interstitial regions, the present viewing film provides higher contrast and less ambient light is reflected back to the observer. It is preferred that light absorptive particles be used for the interstitial regions rather than a continuous black material in order to minimize the area of black material in contact with side surfaces of the tapered waveguides. A continuous black material in interstitial regions would result in excess absorption loss to light transmitted through waveguides via the mechanism of frustrated internal reflection. The light absorbing component is preferably maintained at least about 1 micron, and preferably greater than about 3 microns from the side surface of the waveguide. Any light absorptive material may be used to form the particles. Examples of useful light absorptive black particulate material include carbon lampblack powder, mixtures of carbon black and toner, and mixtures of carbon black and fluoropolymer. The light absorptive black particulate material causes the array to appear a dark matte black and provides good light transmission and little surface reflection (either specular or diffused) when observed from the viewer's side of the display device.

The total number of tapered waveguides 12 in each unit 26 is most preferably at least 2 or more. A viewing film has a plurality of units 26 on a substrate and the total number of units 26 depends upon the desired final size of the viewing film. In the limiting case, each unit has an area equal to the entire display area and each waveguide is statistically different.

Figure 7:
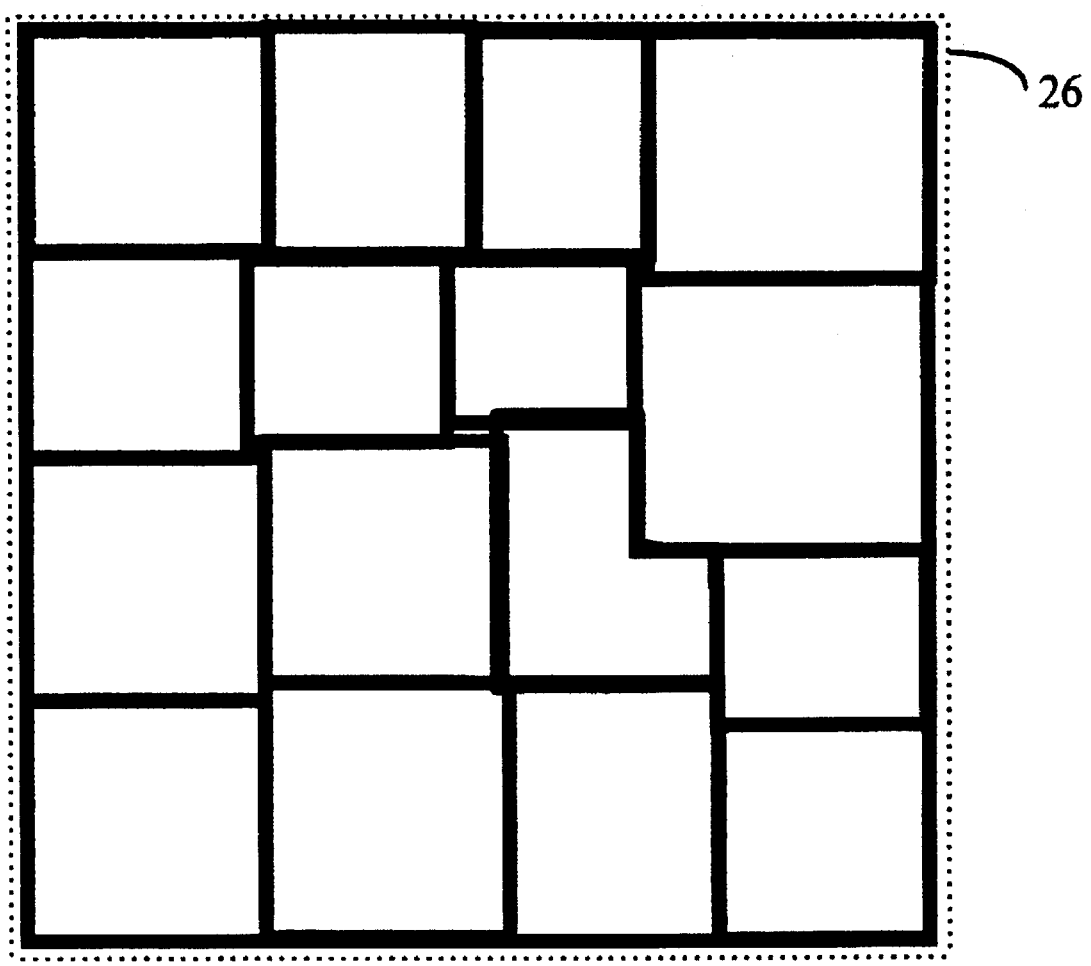
FIG. 7 illustates the design of a lithographic phototool which was used to photolithographically define 16 different optical waveguides as the repeat unit of a viewing film.

Given the foregoing method of manufacture, the pattern of light areas and dark areas on the mask allows one to arbitrarily choose the shape, size, and orientation of light input areas 14 of the viewing screen. FIG. 7 illustrates the top view of a lithographic phototool which was used to photolithographically define sixteen different tapered optical waveguides as the repeat unit 26 of an optical element. The heavy dark lines indicate the dark areas of the photomask which in the lithography process define the input light surface area 14. Example 2 will describe the result of having used this phototool.

The tapered waveguides 12 may be made on any substrate. At a minimum, the substrate is transparent to light within the wavelength range from about 400 to about 700 nm, as this visible wavelength region is the most desirable region in which the optical waveguides to be formed will operate. It is more preferred that the substrate also transmits ultraviolet light in the region from about 250 to about 400 nm as this is the region in which many useful photoinitiators absorb light. Additionally, if it is desired to utilize the present viewing film in the near infrared region, from about 700 nm to about 2000 nm, then it would be preferred to use a substrate which is transparent in that region as well. The index of refraction of substrate may range from about 1.45 to about 1.65. The most preferred index of refraction is from about 1.50 to about 1.60.

Preferred substrate materials are commercially available and include transparent polymers, glass, and fused silica, Useful transparent polymers include polyesters such as poly(ethylene terephthalate) and poly(ethylene terephthalate glycol), polyacrylates and methacrylates, polystyrene, and polycarbonates. Desired characteristics of these materials include mechanical and optical stability at typical operating temperatures of the display device. Compared with glass, transparent polymers have the added advantage of structural flexibility which allows products to be formed in large sheets and then cut and laminated as necessary. The preferred materials for substrate are glass and polyester such as polyethylene terephthalate. The thickness of substrate may vary widely. Preferably, the thickness of substrate is about 0.5 mil (0.0005 inch or 12 microns) to about 10 mil (0.01 inch or 250 microns). The tapered waveguides 12 may also be manufactured directly on a polarizer element.

Figure 8:
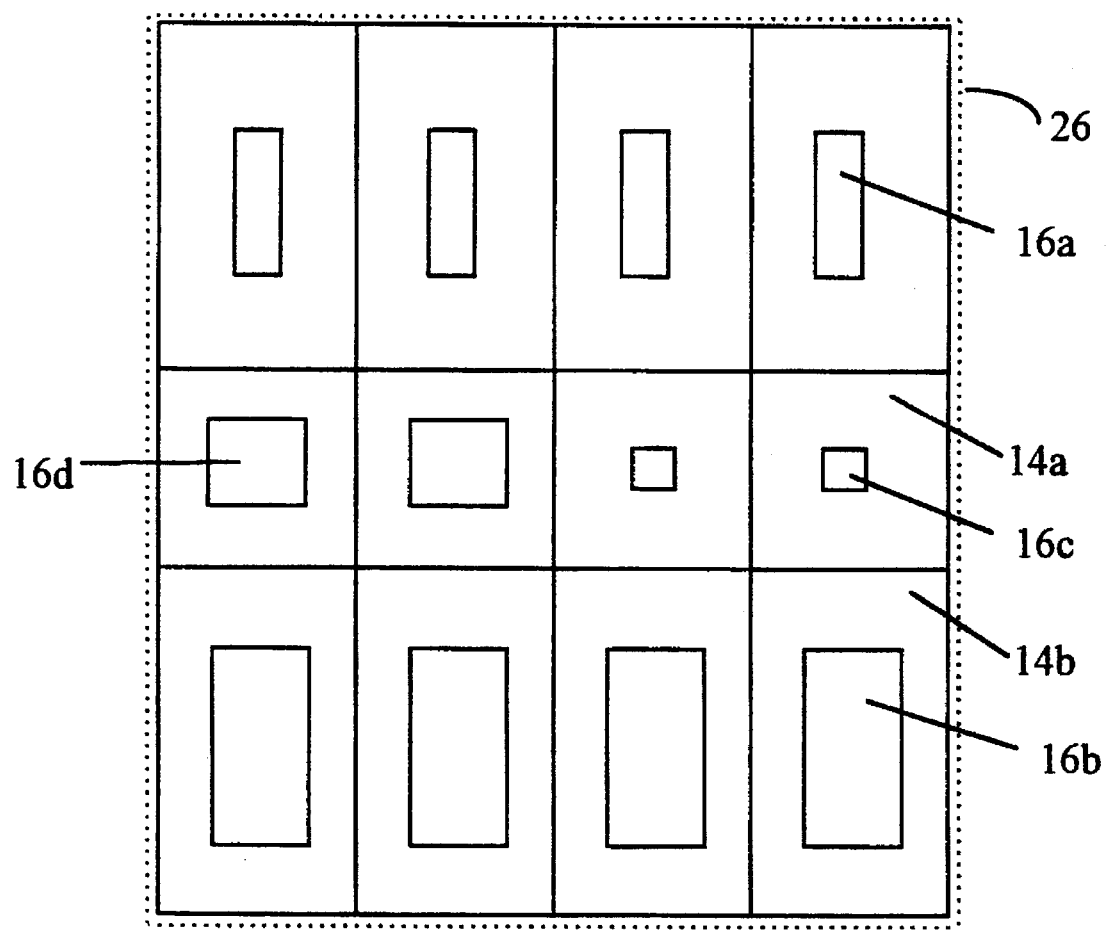
FIG. 8 illustrates one possible arrangement of tapered optical waveguide elements within a unit 26 which contains different light input surface areas 14a and 14b and different light output areas 16a–16d.

FIG. 8 illustrates one possible arrangement of tapered optical waveguide elements within a unit 26 which contains different light input surface areas 14a and 14b and different light output areas 16a–16d. In this case the unit contains twelve tapered optical waveguide elements. Eight of those elements contain identical rectangular light input surface areas 14b. Of those eight elements, four contain narrow rectangular output light surface areas 16a and four others contain wide rectangular output light surface areas 16b. The remaining four elements contain identical square light input surface areas 14a. Of these four elements, two contain narrow square output light surface areas 16c and two others contain wide square output light surface areas 16d. Due to the mixture of rectangular elements and square elements, the resulting unit will have an output light distribution with a preponderance of light distributed into a direction perpendicular to the long axis of the rectangles. FIG. 8 is meant to illustrate that any combination of elements may be combined within a unit. The choice of units is made to tailor the distribution of light to meet the needs of the user.

Examples of useful adhesives for adhesive layer include pressure sensitive adhesives, such as ethylenic adhesives and vinyl acetate adhesives; thermosetting adhesives such as epoxies, urethanes, and silicones; and photopolymerizable adhesives, such as acrylates, methacrylates, and urethanes and mixtures thereof. If the substrate is glass, appropriate adhesion promotion may be achieved by reacting the glass surface with certain types of silane compounds including 3-(trimethoxysilyl)propyl methacrylate; 3-acryloxypropyl trichlorosilane; and trimethylsilylpropylmethacrylate. If the substrate is polyethylene terephthalate (PET), adhesion promotion may be provided by using an adhesion treated PET film such as Hostaphan 4500 (Hoechst-Celanese). If the substrate is emulsion coated, adhesion promotion may be provided by 3-acryloxypropyltrichlorosilane (Hüls America A0396).

A protective layer may be used over the output ends of the tapered waveguides 12 to prevent mechanical damage to the output surfaces of the tapered waveguides and also serve to confine light absorptive particulate material to interstitial regions between tapered waveguides. The protective layer may be an extruded or laminated overcoat. A protective layer may also be applied to the output surfaces of the tapered waveguides 12 before filling the interstitial regions with a light absorptive black particulate material. Protective layer is composed of a transparent backing material as for example the material used to form support layer and optionally and preferably anti-reflective film formed from a material such as magnesium fluoride, which reduces specular reflections of ambient light from the surface of the tapered waveguides 12. An anti-reflective coating may also be evaporated directly on the light output ends of the tapered waveguides and interstitial regions. Examples of useful anti-reflective coatings are the fluoropolymers taught by commonly assigned U.S. Pat. Nos. 5,061,769; 5,118,579; 5,139,879; and 5,178,955 to Aharoni et al.

The present viewing film may be used in the improved polarizer of commonly assigned U.S. patent application Ser. No. 296,569 filed Aug. 26, 1994 U.S. Pat. No. 5,521,726 and the direct-view flat panel display devices of commonly assigned U.S. patent application Ser. No. 86,414 filed Jul. 1, 1993 now U.S. Pat. No. 5,481,385 which are incorporated herein by reference. Such polarizers and the resulting display devices are used in computer terminals, televisions, airplane cockpit displays, automotive instrument panels, and other devices that provide text, graphics, or video information. In addition, the present viewing film may be used to alter or improve the optical characteristics of other information displaying means such as road signs, cathode ray tube (CRT) displays, dead front displays and other text, graphic or video information displays which do not fall in the category of flat panel devices, or to alter or improve the brightness or optical characteristics of lighting systems.

The present invention is more fully illustrated by the following nonlimiting Examples.

EXAMPLE 1

Figure 9:
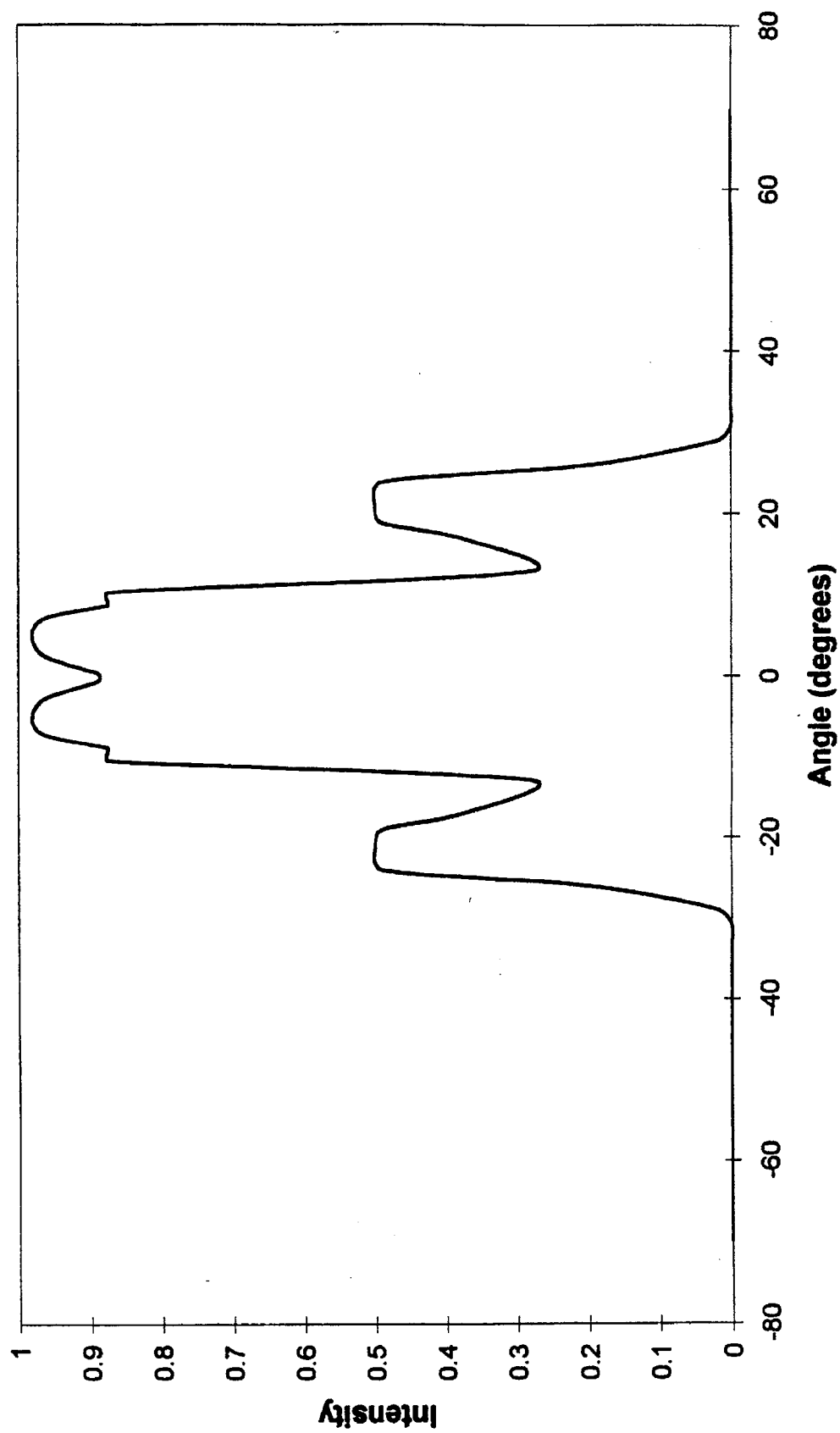
FIG. 9 illustrates the resulting light distribution of the tapered optical waveguide element having a square output surface area which is 25 microns on a side used in Example 1.
Figure 11A:
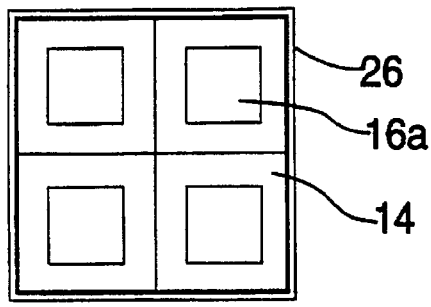
FIG. 11(a)–11(e) illustrates a top view of a unit 26 of four different optical waveguide elements. In each case (a)–(e), the input surface areas 14 and the output surface areas 16 are noted. The successive figures show possible ways of creating units 26 in which combinations of two different output surface areas 16a and 16b are considered.
Figure 11B:
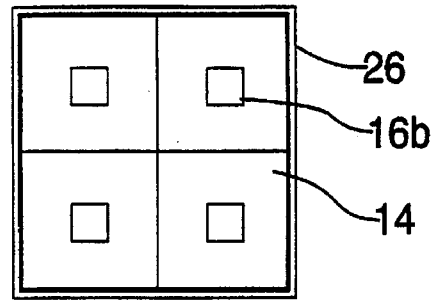
Figure 11C:
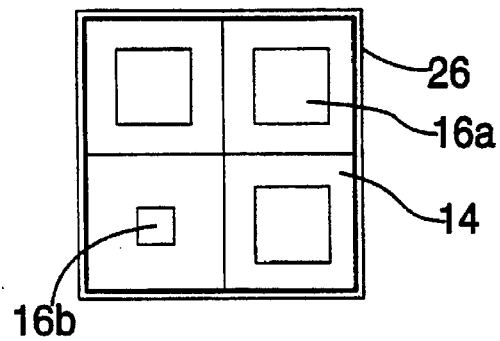
Figure 11D:
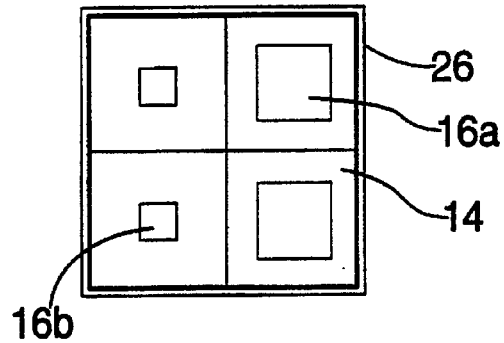
Figure 11E:
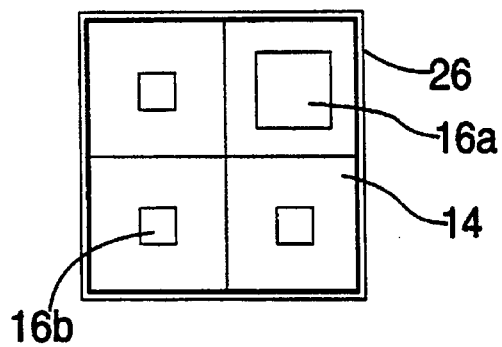

Two tapered waveguide geometries were modeled and then combined mathematically into units 26 to comprise different optical elements. The two waveguides had identical heights but different output surface areas. For both geometries, both the light input and output surfaces were square. The non-imaging optical properties of tapered waveguides may be modeled using a non-sequential ray tracing computer program. FIG. 9 shows the output distribution of a particular tapered waveguide assuming an input of 10,000 light rays randomly distributed over the light input surface area and randomly distributed over input angles of −10 to +10 degrees. The tapered waveguide which was modeled had a square light input surface area which was 45 microns on a side, a square light output surface area which was 25 microns on a side, a height of 125 microns, straight sidewalls, and a taper angle of 4.6 degrees. The light output surface area is 31% of the light input surface area. Arrow 30 within FIG. 10 corresponds to the maximum relative light intensity of the output distribution. Arrow 28 corresponds to the intensity of the hot spot taken as the intensity distance from the first minimum to the first maximum of the output distribution away from the main central peak. By finding the ratio of the hot spot intensity 28 to the maximum light intensity 30, a value for the relative hot spot intensity can be obtained and compared between output distributions from different tapered optical waveguides.

FIG. 10 shows the output distribution of another tapered waveguide assuming an input of 10,000 light rays randomly distributed over the light input surface area and randomly distributed over input angles of −10 to +10 degrees. The tapered waveguide which was modeled had a square light input surface area which was 45 microns on a side, a square light output surface area which was 10 microns on a side, a height of 125 microns, straight sidewalls, and a taper angle of 8 degrees. The light output surface area is 5% of the light input surface area.

Figure 12:
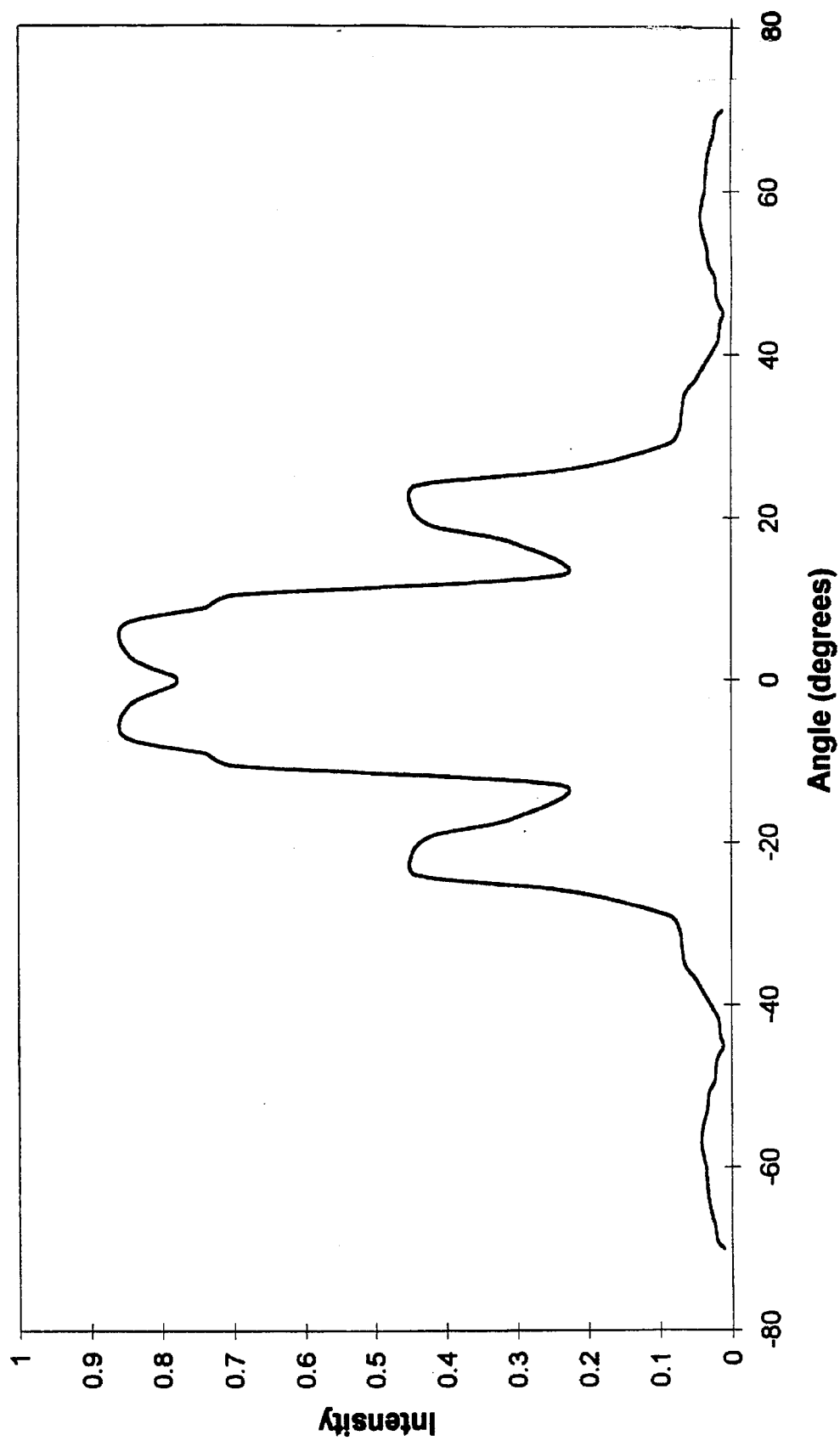
FIG. 12 illustrates the resulting distribution from combining the tapered optical waveguide elements as depicted in FIG. 11(c).
Figure 13:
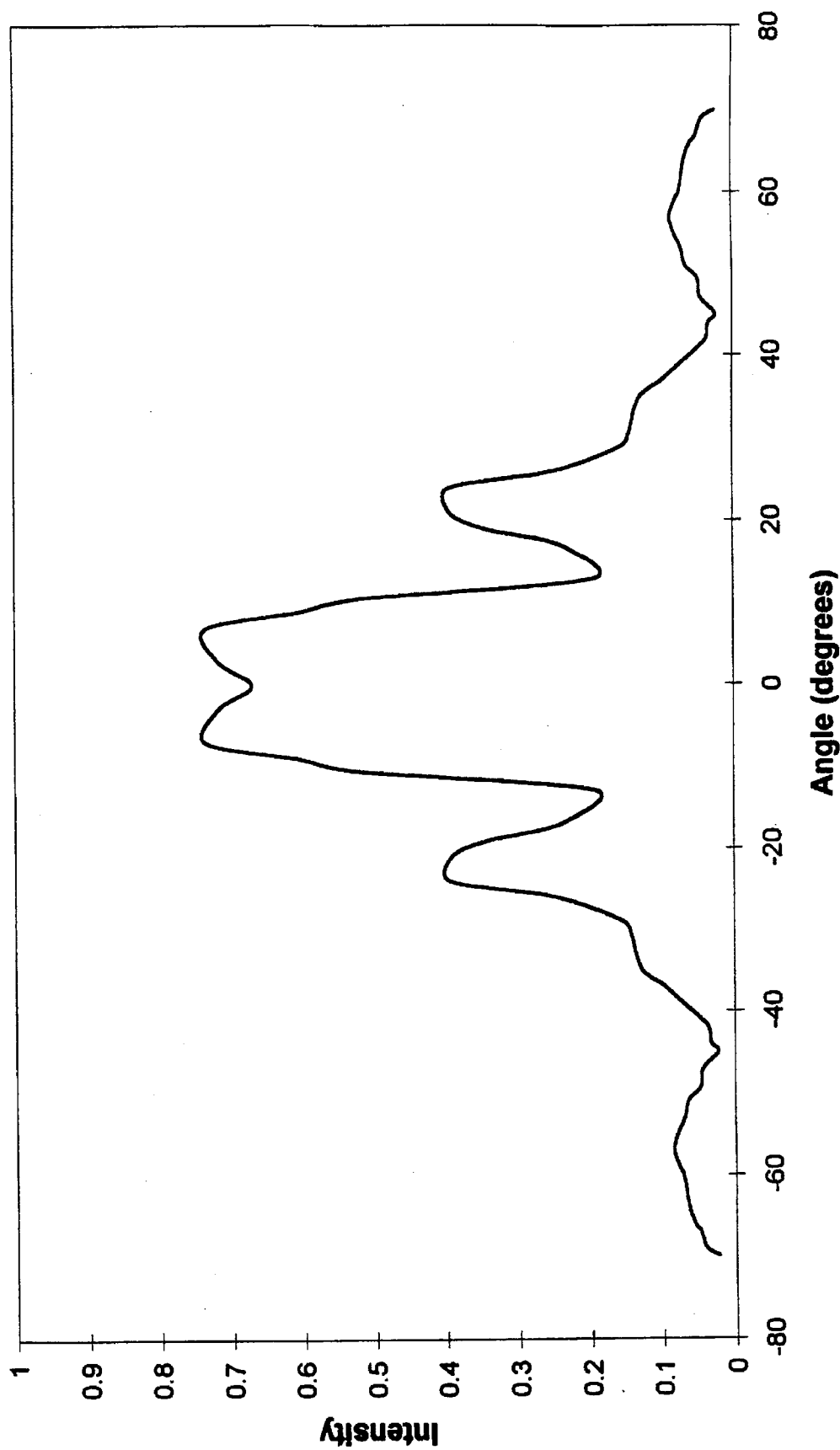
FIG. 13 illustrates the resulting distribution from combining the tapered optical waveguide elements as depicted in FIG. 11(d).
Figure 14:
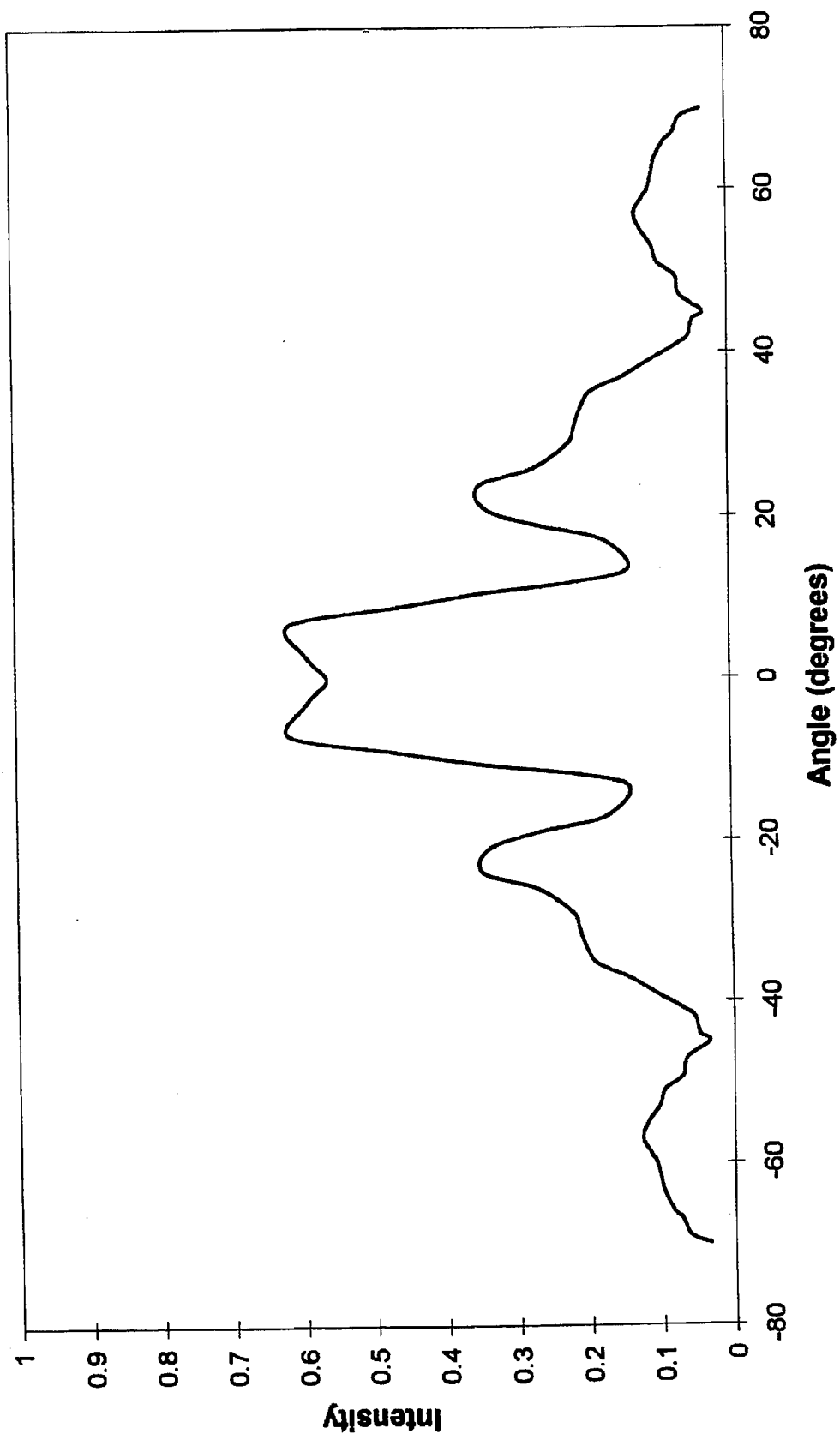
FIG. 14 illustrates the resulting distribution from combining the tapered optical waveguide elements as depicted in FIG. 11(e).

FIG. 11 illustrates a top view of a unit 26 of four different optical waveguide elements. In each case (a)–(e), the input surface areas 14 and the output surface areas 16 are noted. The successive figures show possible ways of creating unit 26 in which combinations of two different output surface areas 16a and 16b are considered. The input light surface areas 14 of all four tapered optical waveguides in this example was held constant. The output distribution from FIG. 9 corresponded to the unit of optical waveguide elements as depicted in FIG. 11a. Likewise, output distribution in FIG. 10 corresponded to the unit depicted in FIG. 11b; output distribution in FIG. 12 corresponded to the unit depicted in FIG. 11c; output distribution in FIG. 13 corresponded to the unit depicted in FIG. 11d; and output distribution in FIG. 14 corresponded to the unit depicted in FIG. 11e. By sequentially considering each of the combinations of tapered optical waveguides with two different output light surface areas, the progression of these figures illustrates that the effective output light distribution can be tailored to the user's needs. Specifically, in this example, the full width at half maximum of the light output distribution was altered by simply combining the different number of tapered optical waveguide elements with broad and narrow light output distributions. Additionally, the magnitude of the relative hot spot intensity taken as the ratio of the hot spot intensity 28 to the maximum light intensity 30 was seen to change from one combination to the next. To conclude, the combination of output distribution and hot spot intensity which best suits a given application would be choosen.

EXAMPLE 2

An array of 16 different shaped tapered optical waveguides was fabricated by the technique described above. The phototool used for this fabrication process had sixteen polygons of varying dimension collected together to create a unit cell array. The dimensions on the phototool and thus on the input light surfaces of the resulting optical waveguides ranged from 35 to 60 microns. The geometries were primarily square or nearly square. After the fabrication process, the dimensions of the output light surfaces ranged from 12 to 32 microns and were also square or nearly square.

Figure 15:
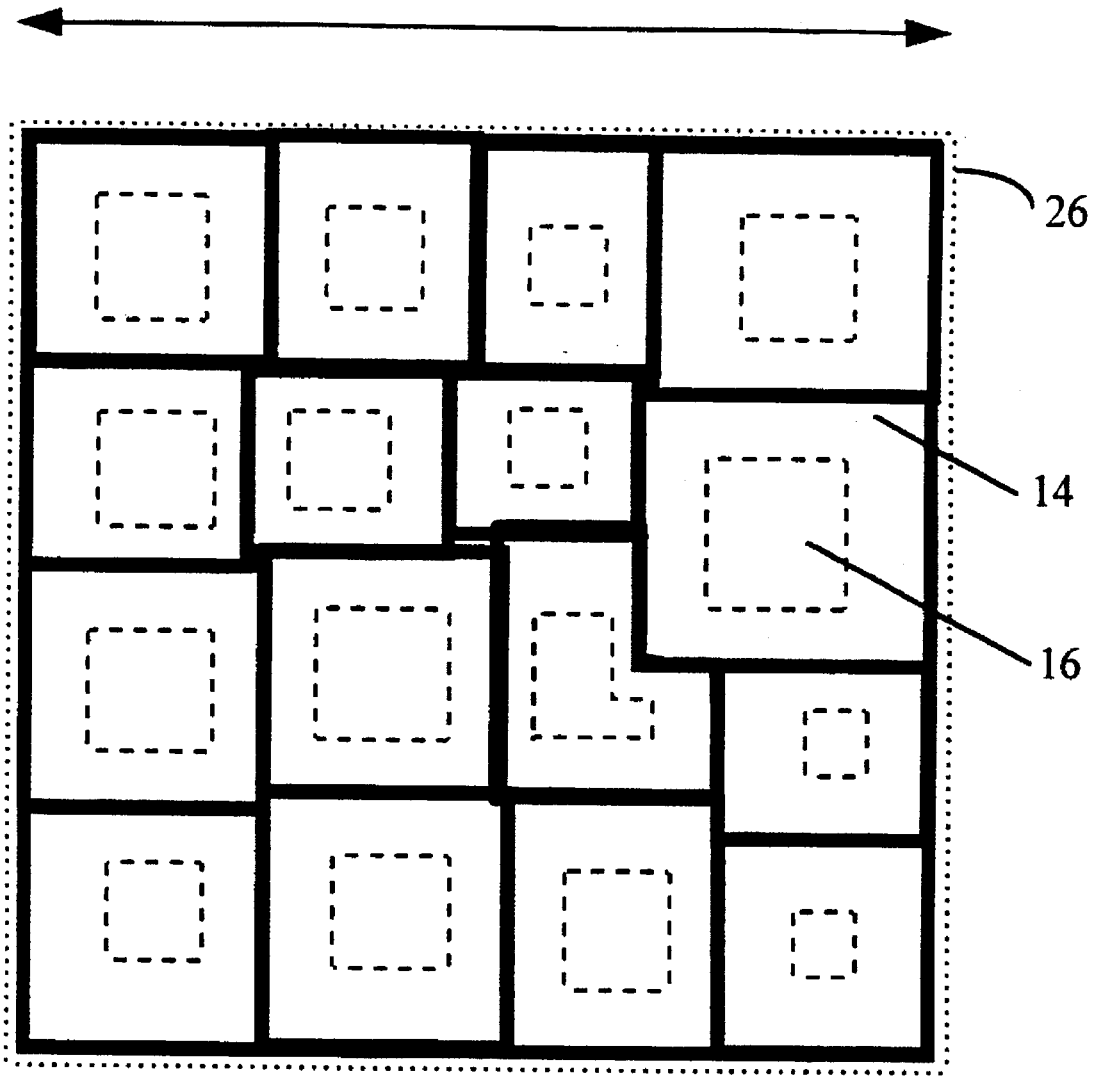
FIG. 15 illustrates the top view schematic representation of the resulting optical device described in Example 2.

Optical micrographs of the light input surfaces and light output surfaces of the resulting optical device were taken. From these micrographs, the top view schematic representation of the resulting optical device was measured and created. Note in FIG. 15 that the length of the unit 26 is 200 microns. The light input surfaces 14 are denoted by thick lines representing the space between the input surfaces of the tapered optical waveguide elements which was 10 microns on average. The dashed lines depict the output light surface areas 16. The intersitial regions were filled with a light absorptive black particulate material. By directing a collimated helium-neon laser beam perpendicularly into the light input surface areas 14, the output light distribution of the resulting optical device was examined. The output distribution was noted to have a combined effect that was unique from that expected from an optical device consisting of just one type of tapered optical waveguide.

What is claimed is:

1. An optical device comprising:
   (a) a substrate; and
   (b) a plurality of units on said substrate, each of said units comprising a plurality of tapered waveguides wherein:
      (i) each of said waveguides has a light input surface adjacent said substrate (a) and a light output surface distal from said light input surface and said light input surface area is greater than said light output surface area;
      (ii) each of said waveguides tapers from its light input surface to its light output surface at an angle; and
      (iii) at least one of said light input surface area or said light output surface area of at least one of said tapered waveguides is different than the corresponding surface area of the remaining tapered waveguides in said unit.

2. The optical device of claim 1 wherein the total number of said tapered waveguides in each of said units is at least about 2.

3. The optical device of claim 2 wherein said at least one of said light input surface area or said light output surface area of at least one of said tapered waveguides is different than the corresponding surface area of the remaining tapered waveguides in said unit by at least about 2 percent.

4. The optical device of claim 2 wherein said at least one of said light input surface area or said light output surface area of at least one of said tapered waveguides is different than the corresponding surface area of the remaining tapered waveguides in said unit by at least about 5 percent.

5. The optical device of claim 2 wherein said at least one of said light input surface area or said light output surface area of at least one of said tapered waveguides is different than the corresponding surface area of the remaining tapered waveguides in said unit by at least about 20 percent.

6. The optical device of claim 1 wherein at least two of said tapered waveguides in said unit have at least one of their light input surface areas or light output surface areas which are different than the corresponding surface areas of the remaining tapered waveguides in said unit.

7. The optical device of claim 6 wherein said at least two of said tapered waveguides have both of their light input surface areas and light output surface areas which are different than the corresponding surface areas of the remaining tapered waveguides in said unit.

8. The optical device of claim 1 wherein each of said tapered waveguides in said unit has at least one of its light input surface area or its light output surface area which is different than the corresponding surface area of each of said remaining tapered waveguides in said unit.

9. The optical device of claim 8 wherein the total number of said tapered waveguides in each of said units is at least about three.

10. The optical device of claim 1 wherein said at least one of said light input surface area or said light output surface area of at least one of said tapered waveguides is different than the corresponding surface area of the remaining tapered waveguides in said unit by at least about 2 percent.

11. The optical device of claim 1 wherein said at least one of said light input surface area or said light output surface area of at least one of said tapered waveguides is different than the corresponding surface area of the remaining tapered waveguides in said unit by at least about 5 percent.

12. The optical device of claim 1 wherein said at least one of said light input surface area or said light output surface area of at least one of said tapered waveguides is different than the corresponding surface area of the remaining tapered waveguides in said unit by at least about 20 percent.

13. The optical device of claim 1 wherein said at least one of said tapered waveguides in said unit has a different light input surface area compared with the light input surface area of every remaining tapered waveguide in said unit.

14. The optical device of claim 1 wherein said at least one of said tapered waveguides in said unit has a different light output surface area compared to the light output surface area of every remaining tapered waveguide in said unit.

15. The optical device of claim 1 wherein said at least one of said tapered waveguides in said unit has different light input and output surface areas compared with said light input and output surface areas of every remaining tapered waveguide in said unit.

16. A viewing film comprising:
  (a) a substrate; and
  (b) a plurality of units on said substrate, each of said units comprising a plurality of tapered waveguides wherein:
    (i) each of said waveguides has a light input surface adjacent said substrate (a) and a light output surface distal from said light input surface and said light input surface area is greater than said light output surface area;
    (ii) each of said waveguides tapers from its light input surface to its light output surface at an angle; and
    (iii) at least one of said light input surface area or said light output surface area of at least one of said tapered waveguides is different than the corresponding surface area of the remaining tapered waveguides in said unit.

17. The viewing film of claim 16 wherein the total number of said tapered waveguides in each of said units is at least about 2.

18. The viewing film of claim 16 wherein said at least one of said light input surface area or said light output surface area of at least one of said tapered waveguides is different than the corresponding surface area of the remaining tapered waveguides in said unit by at least about 2 percent.

19. The viewing film of claim 16 wherein said at least one of said light input surface area or said light output surface area of at least one of said tapered waveguides is different than the corresponding surface area of the remaining tapered waveguides in said unit by at least about 5 percent.

20. The viewing film of claim 16 wherein said at least one of said light input surface area or said light output surface area of at least one of said tapered waveguides is different than the corresponding surface area of the remaining tapered waveguides within said unit.

* * * * *